Feb. 2, 1965    R. S. DAVIS ETAL    3,168,616
SEQUENCED PHASED PANEL
Filed April 8, 1964    5 Sheets-Sheet 1

INVENTORS
RUSSELL S. DAVIS
RALPH G. CLEMENT
BY
OSTROLENK, FABER, GERB & SOFFEN
ATTORNEYS

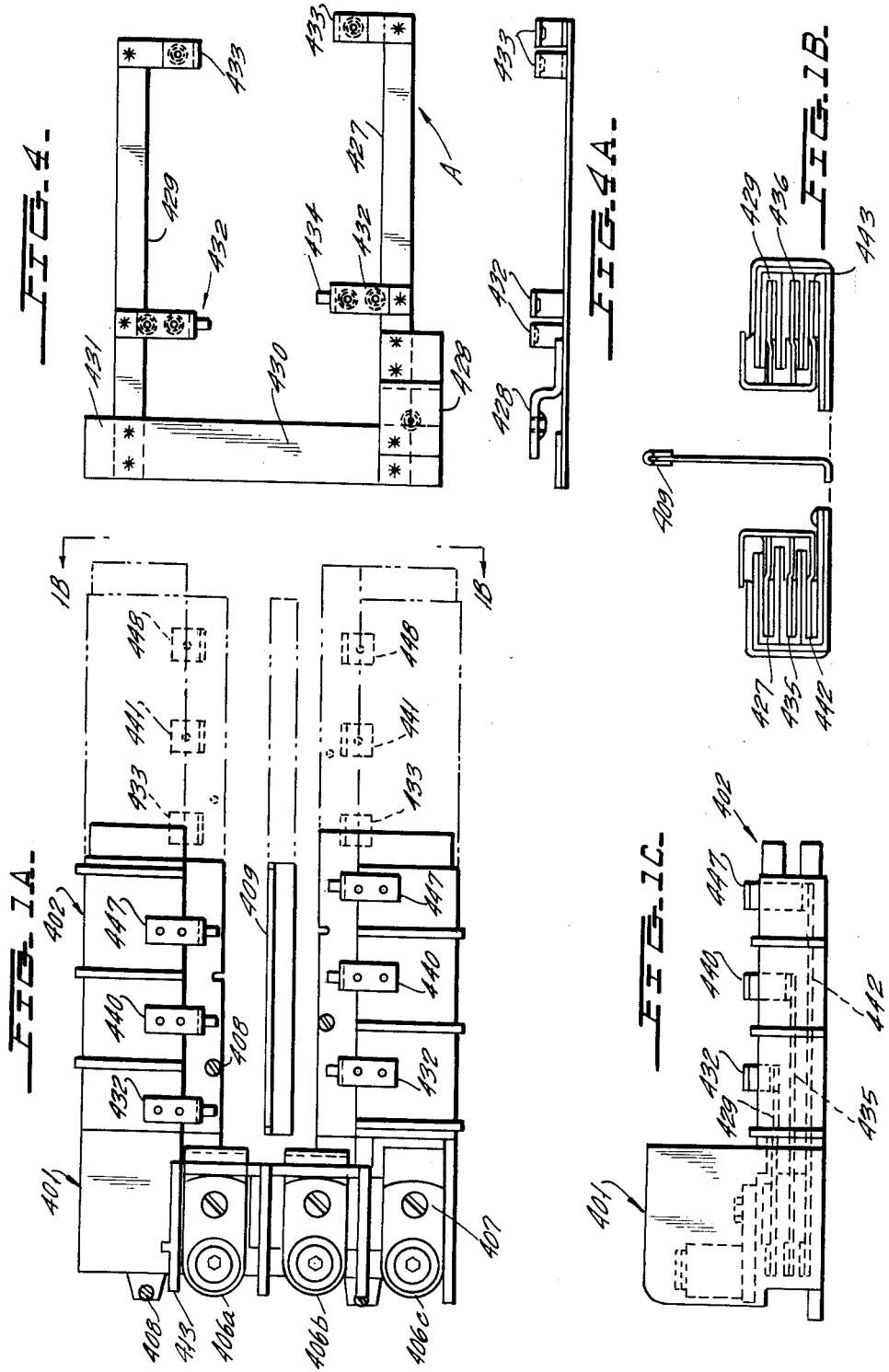

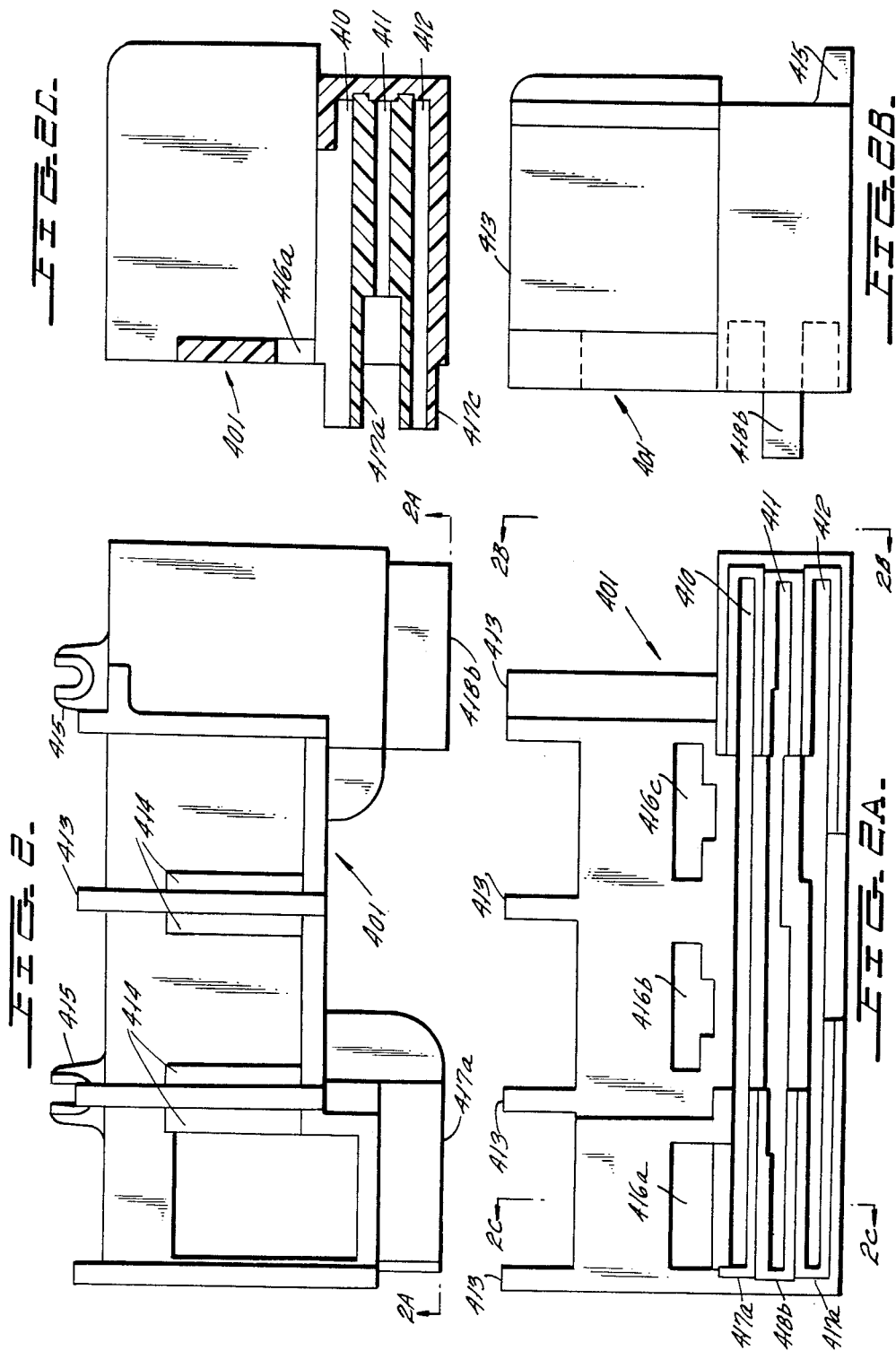

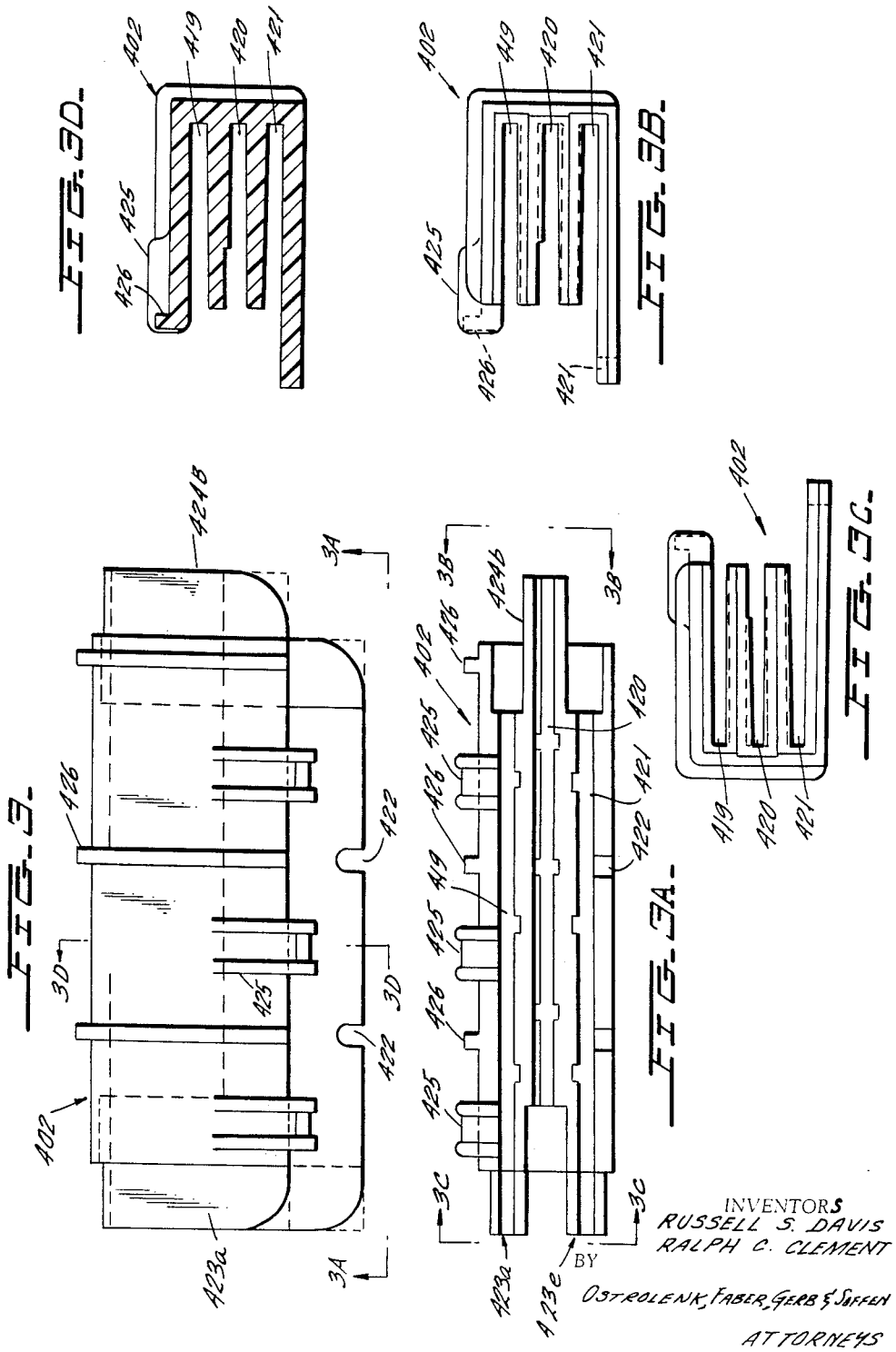

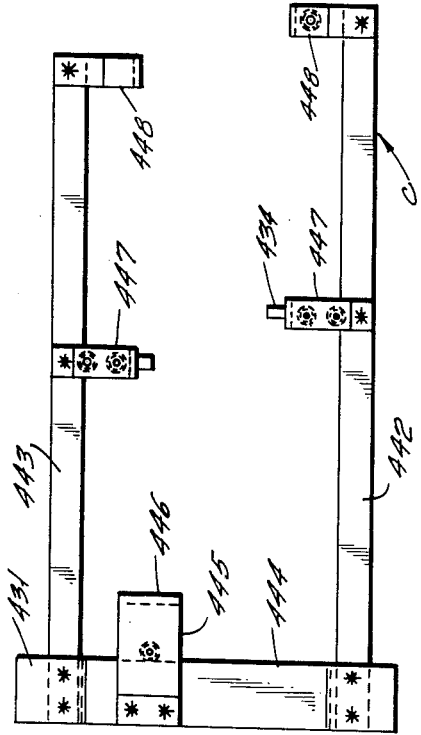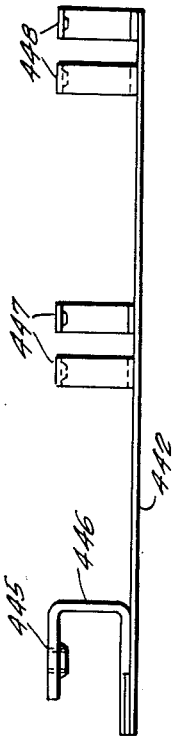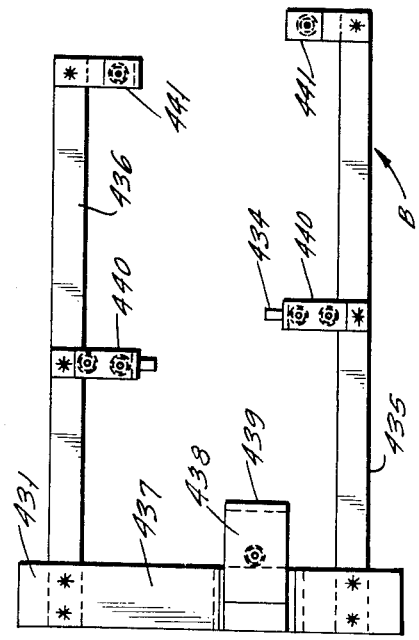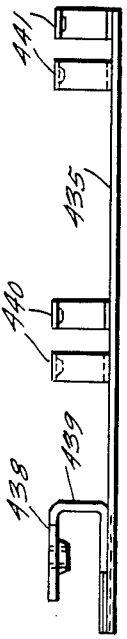

United States Patent Office 3,168,616
Patented Feb. 2, 1965

3,168,616
SEQUENCED PHASED PANEL
Russell S. Davis, Detroit, and Ralph C. Clement, Mount Clemens, Mich., assignors to I-T-E Circuit Breaker Company, Philadelphia, Pa., a corporation of Pennsylvania
Filed Apr. 8, 1964, Ser. No. 358,344
10 Claims. (Cl. 174—99)

Our invention relates to panel interiors for three-phase, four-wire panelboard arrangements which are adapted to receive either 1, 2 or 3-pole circuit breakers in various combinations.

Our present invention represents an improvement over copending U.S. applications, Serial No. 285,680, filed June 5, 1963 in the names of John A. Herrmann and Elwood T. Platz, entitled "Sequenced Phase Panelboard," and Serial No. 285,679, filed June 5, 1963, in the name of Ralph C. Clement, entitled "Improved Sequenced Phased Panelboard," both of which are assigned to the assignee of the instant invention.

The panel interior of our present invention is also particularly adaptable for use in conjunction with the type of circuit breaker disclosed in U.S. Patents 2,880,263 issued March 31, 1959 to J. A. Herrmann et al., entitled "Narrow Panelboard Having Suspended Main Lugs," 2,894,080 issued July 7, 1959 to J. A. Herrmann et al., entitled "100 Ampere Disconnect Push Switch," and 2,938,983 issued March 31, 1960 to R. W. Thomas, entitled "Circuit Breaker Latch," as well as copending U.S. application Serial No. 285,681 filed June 5, 1963 in the name of Elwood T. Platz, entitled "Multi-Pole Circuit Breaker," all assigned to the assignee of the instant invention.

The multi-phase panel interior of our invention is comprised of several basic components, namely a main lug molding, side channel moldings, and a conductor assembly for each of the three phases of the panel interior.

With our novel arrangement, we have provided a construction whereby both the main lug molding and the side channel moldings have channels therein to receive the conductor assemblies so that the conductor assemblies can be located in flat spaced parallel relation to each other. The moldings are so constructed that there is one end of each of the moldings which has a single extension from one channel and the other end has two extensions from the remaining two channels. By this novel arrangement, it is possible to have all side channel moldings of identical construction so that the panel interior can be made as large or as small as desired for a particular installation by utilizing a plurality of identical side channel moldings. Furthermore, the side channel moldings and the main lug molding can be interlocked by having the end with the two extensions straddle the single extension end of the molding to which it is to be connected. Thus, in this manner, a first side channel molding can have its double extension end interlocked with the single extension end of the main lug molding and a second side channel molding can have its single extension end interlocked with a double extension end of the main lug molding. This combination would form a U-shape arrangement in which the channels of the first and second side channel moldings are in registry with the channels of the main lug molding, and, further, in which the moldings will encompass three sides of the conductor assemblies.

The arrangement further provides for enlargement of the basic panel interior by permitting a third side channel molding to have its double extension end interlocked directly with the single extension end of the first side channel molding and also to have a fourth side channel molding added by having its single extension end interlocked with the double extension end of the second side channel molding.

The plurality of conductor assemblies, which could correspond to phases A, B and C, are constructed with side conductors connected together by a cross conductor to thereby form a U-shape member so that the cross conductor is encased within a channel of the main lug molding and the side conductors are encased within a first and second side channel molding. Furthermore, the conductor assemblies are provided with conductor straps, which extend generally perpendicular to the plane of the side conductors and terminate on a common surface of the side channel moldings.

Thus, with this arrangement, it is possible to arrange a sequence phased panel interior in which the sequence arrangements of the conductor straps is represented for each side channel molding added on to the panel interior.

Accordingly, a primary object of our invention is to provide a panel interior whereby two basic molding configurations can be used to construct a panel of any desired number of circuits.

Another object of our invention is to provide moldings for a panel interior whereby one end has a single extension from a second channel and the other end has two extensions from a first and third channel, thereby permitting interlock between moldings to be positioned adjacent one another while still retaining registry of corresponding channels.

Still another object of our invention is to provide a panel interior having a main lug molding and a plurality of side channel moldings, all of which are of identical construction to each other and so constructed that side channel moldings can be interlocked with each other or with the main lug molding.

A still further object of our invention is to provide moldings for a panel interior whereby conductor assemblies are substantially encased on three sides and in which the interlocked extensions of the moldings serve to not only interlock adjacent moldings but also serve to provide dielectric strength between conductor assemblies of different phases.

Another object of our invention is to provide a novel panel interior in which the cross-conductor and side conductors of the first, second and third conductor assemblies respectively are positioned in a single first, second and third plane, respectively.

Still another object of our invention is to provide (a) a three-phase, four-wire panel interior that can accommodate either single-pole, double-pole or three-pole circuit breakers, (b) has sequenced phased arrangements for the conductor straps, (c) will permit only a predetermined number of circuits to be installed, (d) permits a modular add-on type of molding to enable a minimum number of different parts to meet the insulation requirements of the panel interior, (e) utilize flat electrical conductors, (f) permits the width of the conductors to be changed to meet different ampere rating conditions, and (g) is economically feasible to manufacture.

These and other objects of our invention will be apparent from the following description when taken in connection with the drawings, in which:

FIGURE 1A is a plan view of a typical panel interior assembly showing a main lug molding, a first and second side channel molding and having conductor assemblies positioned therein.

FIGURE 1B is an end view of the panel interior assembly of FIGURE 1A taken in the direction of the arrows 1B—1B.

FIGURE 1C is an elevation view of the panel interior assembly of FIGURE 1A.

FIGURE 2 is a plan view of the main lug molding of FIGURE 1.

FIGURE 2A is an elevation view of FIGURE 2.

FIGURE 2B is an end view of FIGURE 2 taken in the direction of the arrows 2B—2B.

FIGURE 2C is a section view of FIGURE 2 taken in the direction of the arrows 2C—2C.

FIGURE 3 is a plan view of any one of the side channel moldings, such as seen in FIGURE 1.

FIGURE 3A is an elevation view of FIGURE 3 taken in the direction of the arrows 3A—3A.

FIGURE 3B is an end view of FIGURE 3A taken in the direction of the arrows 3B—3B.

FIGURE 3C is an end view of FIGURE 3A taken in the direction of the arrows 3C—3C.

FIGURE 3D is a section view of FIGURE 3 taken in the direction of the arrows 3D—3D.

FIGURES 4, 5 and 6 are plan views of the conductor assemblies for the top (phase A), middle (phase B) and bottom (phase C) assemblies, respectively.

Figure 1:
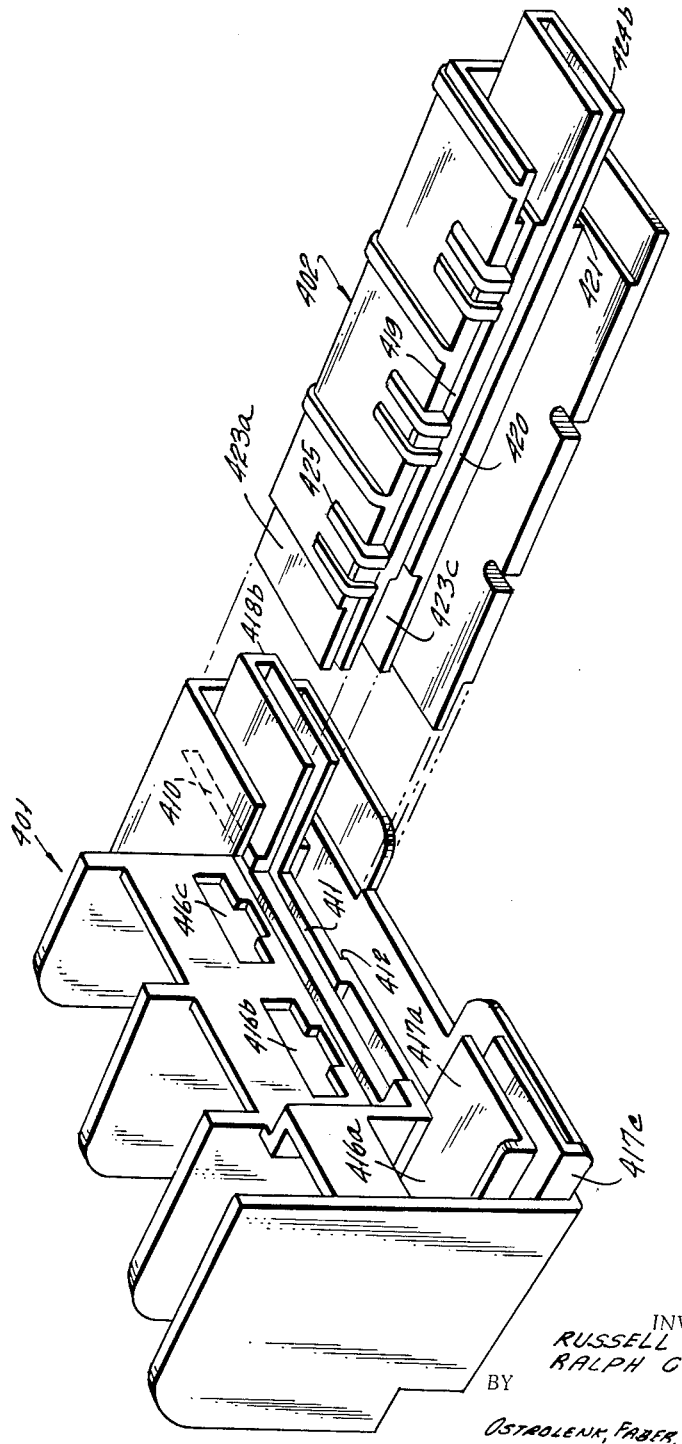
FIGURE 1 is a perspective view of the two basic moldings used in our panel interior and illustrates a main lug molding at the left and a typical side channel molding at the right.

FIGURE 1 illustrates in perspective the two basic moldings to be used in our novel panel interior, namely the main lug molding 401 and the side channel molding 402. The main lug molding 401 is provided with channels 410, 411 and 412, as seen in FIGURES 1 and 2A, which channels are provided to accommodate cross conductors 430, 437 and 444 of conductor assemblies C, B and A, as seen in FIGURES 4, 5 and 6, respectively. The entire main lug molding, 401, is a unitary member formed of any desired insulating material and a single such unit is used in each panel interior. The main lug molding 401 has barriers 413 which provide electrical clearance between main wire grips 406 (FIGURE 1A) and also is provided with projections 414 on the barriers 413 to serve to align the main wire grips 406 and prevent excessive turning of the wire grips. Projections 415 along the front edge of the main lug molding 401 provide a means for securing this molding to a mounting plate. The openings 416a, 416b and 416c provide a means whereby conductors can be positioned to connect the main wire grips 406a, 406b and 406c to their respective cross conductors, 430, 437, 444 through their wire grip adapter conductors 428, 439 and 445 respectively (see FIGURES 4, 5 and 6).

Of particular importance in the construction of the main lug molding 401 is the provision of having one end with a single extension 418b and the other end having double extensions 417a and 417c as best seen in FIGURES 2, 2B and 2C. These extensions 418b, 417a and 417c are utilized to interlock the main lug molding 401 with a first and second side channel molding 402 as will hereinafter be more fully explained.

The single extension 418b is, in fact, an extension of the phase B channel 411 whereas the double extension end, having the extensions 417a and 417c are extensions of the phase A and C channels 410 and 412, respectively.

The side molding channel 402 is seen in perspective at the right end of FIGURE 1 and the details thereof are best seen by reference to FIGURES 3, 3A, 3B, 3C and 3D. It is noted that the side channel member 402 has channels 419, 420 and 421 for phases A, B and C and are in spaced parallel relation with each other. Each side channel molding 402 is provided with slots 422 in the lower flange to permit it to be secured to a mounting plate.

Of particular importance in connection with our present invention is the single extension 424b at one end of the side channel molding and the double extension 423a and 423c at the opposite end of the side channel molding 402. The extension 424b is, in fact, an extension of the phase B channel 420 and the extensions 423a and 423c are extensions of the phase A and C channels 419 and 421, respectively. The entire side channel molding 402 is a unitary device made of a suitable insulating material and is constructed so that its channels 419, 420 and 421 are adapted to receive either the side conductors 429, 436, 443 or 427, 435, 442, respectively, as seen in FIGURES 4, 5 and 6.

Thus, a side channel molding, such as 402, could be interlocked with a main lug molding 401 in the manner seen in FIGURE 1, such that the double end extension 423a and 423c extend around the extension 418b to thereby not only interlock the main lug molding 401 to aid side channel molding 402 but also provide registry of the channels 419, 420, 421 with the channels 410, 411 and 412 for phases A, B and C, respectively, and thereby provide continuity of insulation for the side conductors 429, 436, 443 of the conductor assemblies for phases A, B and C, respectively.

Also, a side channel molding 402 could be interlocked with the opposite end of the main lug molding 401 such that the single extension 424b would fit between the double extension 417a and 417c of the main lug molding 401. Thus, a first and second side channel molding 402 can readily and easily be connected to the main lug molding 401 to form a U-shape substantially as seen in FIGURE 1A. It should also be noted that a side channel molding 402 could be added to the right-hand end of the side channel molding 402 seen in FIGURE 1 by having the double end 423a and 423c at the left end of the side channel molding to be added straddle the single extension 424b of the side channel molding seen in FIGURE 1. In this arrangement, of course, the channels 419, 420 and 421 of the adjacent side channel moldings would be in alignment and readily receive the side conductors of the conductor assemblies positioned therein.

The side channel molding 402 of FIGURES 3, 3A, 3B, 3C and 3D have raised areas 425 on the common upper surface which serve to support and align the circuit breaker connector straps such as 432, 433 as seen in FIGURE 4, 440, 441 as seen in FIGURE 5, and 447, 448 as seen in FIGURE 6. Strengthening ribs 426 can also be provided on the common surface of the side channel molding 402.

In FIGURES 4, 5 and 6, we have shown typical conductor assemblies that can be used for phases A, B and C, respectively, to be received in the channels 419, 420 and 421 of the side channel molding 402 and channels 410, 411 and 412 of the main lug molding 401. Each of the channel assemblies of phases A, B and C have a right side conductor 429, 436 and 443, respectively, a left side conductor 427, 435 and 442, respectively, and a cross-connector 430, 437 and 444, respectively. Thus, it is seen that each of the conductor assemblies forms a U-shape so that it conforms generally to the configuration formed by a main lug molding 401 having a first and second side channel molding 402 interlocked thereto.

Circuit breaker connector straps extend generally perpendicular to the side conductors which provide for each of the conductor assemblies. Thus, for example, there are circuit breaker connector straps 432 and 433 for right side conductor 429 and for left side conductor 427, 440 and 441 for right side conductor 436, 440 and 441 for left side conductor 435, 447 and 448 for right side conductor 443, and 447 and 448 for left side conductor 442. It is noted that connector straps 432, 433, 440, 441, 447, 448 are all the same except that conductor straps 433, 441, 448 all have one hole and conductor straps 432, 440 and 447 all have two holes. It is also noted that the circuit breaker connector straps 432, 433 are of the same height and are the lowest of the three conductor straps since the conductor assembly for phase A as seen in FIGURE 4 would be positioned in the channels 419 and 410 of the side channel molding 402 and main lug molding 401. That is, phase A would be the highest-most level and, thus, the circuit breaker connector straps need be a minimum height in order to have these straps reach the common top surface of the side channel molding 402. On the other hand, the circuit breaker connector straps 447, 448 for the phase C connector assembly of FIGURE 6, are of maximum height since the conductor assembly of phase C is positioned in the bottom-most channel 421 of the side channel molding 402 and 412 of the main lug molding 401. Hence, the circuit breaker connector straps 447 and 448 can end in a common surface of the side channel molding 402 and be positioned by the raised area 425.

Since the conductor assembly for phase B, as seen in FIGURE 5, would be positoined in the center channel 420 and 411 of the side channel molding 402 and the main lug molding 401, its circuit breaker connector straps 440, 441 would be of medium height so that they too can terminate in a common surface of the side channel molding 402.

Thus, it will be seen that with our novel panel interior that each of the first, second and third conductor assemblies, A, B and C, are comprised of a cross-conductor with a wire grip adapter connector as well as two side conductors each of which has connector straps. The cross-conductor and the side conductors of any one conductor assembly all lie in a single plane so that, in fact, the first conductor assembly A lies in a first plane, the second conductor assembly B lines in a second plane, and the third conductor assembly C lies in a third plane. The first, second and third plane of the conductor assemblies A, B and C, correspond to the planes of the first, second and third channels of the main lug molding and the side channel moldings.

Each of the conductor assemblies for phases A, B and C of FIGURES 4, 5 and 6 are also provided with wire grip adapter conductors 428, 438 and 445, respectively. The wire grip adapters 438 and 445 can be provided with insulation 439, 446, respectively, in order to provide the necessary dielectric strength between adjacent phases. These three members have varying heights as described in connection with the circuit breaker connector straps so that they can all extend to the openings 416a, 416b, 416c of the main lug molding 401 to thereby permit them to be connected to the main wire grips 406a, 406b, 406c, as seen in FIGURE 1A.

Thus, in the completed assembled unit, as seen in FIGURE 1A, the main terminal lugs are in sequence arrangement with the lugs being arranged in the sequence of 432, 440, 447 for one side channel molding thereby representing phases A, B and C in sequence and being arranged in a sequence of circuit breaker terminal connector straps 432, 447 for the sequence of phases A, B and C at the opposite common surface of the side channel molding 402.

The panel interior assembly, as seen in FIGURES 1A and 1B, is provided with a circuit breaker mounting plate or rib 409 so either single phased two-pole or three-pole circuit breakers can be selectively connected to the circuit breaker connector straps heretofore described. The mounting of the circuit breakers on the mounting rib 409 is seen in the aforementioned U.S. Patent 2,880,263.

It is noted that, if desired, pins 434 can be placed in the circuit breaker connector straps in order to prevent the electrical connection of circuit breakers thereto and, thus, limit the number of circuits to be connected to the panel interior.

Thus, it will be seen that for the smallest number of circuits, our novel invention is comprised of six basic components, namely the main lug molding 401, a first and second side channel molding 402, and a first, second and third conductor assembly A, B and C. These units are assembled by slipping the first side channel moldings 402 over the side conductors 429, 436, 443 of the conductor assemblies A, B and C so that the side conductors fit into the respective channels 419, 420 and 421 respectively. In like manner, a second side channel molding is slipped over side conductors 427, 435 and 442. The connector straps, such as 432, 433, 440, 441, 447, 448 fit into the raised areas 425 of the side chanel molding 402. The main lug molding 401 is then slipped over the cross-connectors 430, 437 and 444 of the conductor assemblies A, B and C. At this time, the second extension 418b of the main lug molding 401 will interlock with the first and third extension 423a and 423c of the side channel molding 402. In like manner, the second extension 424b of the second side channel molding 402 is interlocked with the first and third extension 417a and 417c of the main lug molding 401. The main wire grips 406a, b and c are then secured into position with securing means 407. The entire assembly can then be fastened to a mounting plate by securing means 408, which mounting plate would contain the mounting rib 409.

Our novel panel interior can have common molding 401 and 402 for all ampere rating condition since only the width of the side conductors (427–429, 435–436, 442–443) and cross-conductors (430, 437, 444) need be changed for different current ratings.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A multi-phase panel interior of the type described comprised of a main lug molding, a first and second side channel molding, and a first, second and third conductor assembly; said first, second and third conductor assemblies each being comprised of a cross conductor with wire grip adapter connectors and two side conductors each with connector straps; said cross conductor and said side conductors of said first conductor assembly all lying in a single first plane; said cross conductor and said side conductors of said second conductor assembly all lying in a single second plane; said cross conductor and said side conductors of said third conductor assembly all lying in a single third plane; said first and second side channel molding being of identical construction; said first and second side channel moldings and said main lug molding each being constructed with a first, second and third channel; said first channels of said first and second side channel molding and of said main lug molding lying in a single first plane; said second channels of said first and second side channel molding and of said main lug molding lying in a single second plane; said third channels of said first and second side channel molding and of said main lug molding lying in a single third plane; said first, second and third channels being in flat parallel relation with each other and adapted to receive said first, second and third conductor assemblies, respectively; a second extension at one end of each of said second channels extending beyond the corresponding end of both said first and third channels; a first and third extension at the other end of said first and third channels respectively extending beyond the corresponding end of said second channel; said first and second side channel molding interlocked to said main lug molding by having said second extension secured between said first and third extensions.

2. The device of claim 1 in which said first and second side channel molding and said main lug molding form a U-shaped support for said first, second and third conductor assemblies and a mounting rib positioned between said first and second side channel moldings and perpendicular to said first, second and third planes.

3. The device of claim 2 in which said connector straps extend generally perpendicular to said side conductors of said conductor assemblies; said connector straps all terminating on a common surface of said side channel moldings to thereby permit protective equipment to be electrically connected to said conductor assemblies.

4. The device of claim 2 and a third and fourth side channel molding being identical in construction to each other and to said first and second side channel molding; said third and fourth side channel molding interlocked to said first and second side channel molding by having said second extension secured between said first and third extensions.

5. The device of claim 4 in which said connector straps extend generally perpendicular to said side conductors of said conductor assemblies; said connector straps all terminating on a common surface of said side channel moldings to thereby permit protective equipment to be electrically connected to said conductor assemblies; said connector straps being in sequence arrangement whereby said connector straps from said first, second and third conductor assemblies form a repetitive pattern along said common surface of said side channel molding.

6. A multi-phase panel interior of the type described comprised of a main lug molding, a first and second side channel molding, and a first, second and third conductor assembly; said first, second and third conductor assemblies each being comprised of a cross conductor with wire grip adapter connectors and two side conductors each with connector straps; said cross conductor and said side conductors of said first conductor assembly all lying in a single first plane; said cross conductor and said side conductors of said second conductor assembly all lying in a single second plane; said cross conductor and said side conductors of said third conductor assembly all lying in a single third plane; said first and second side channel molding being of identical construction; said first and second side channel moldings and said main lug molding each being constructed with a first, second and third channel; said first channels of said first and second side channel molding and of said main lug molding lying in a single first plane; said second channels of said first and second side channel molding and of said main lug molding lying in a single second plane; said third channels of said first and second side channel molding and of said main lug molding lying in a single third plane; said first, second and third channel being in flat parallel relation with each other and adapted to receive said first, second and third conductor assemblies, respectively; said first, second and third conductor assemblies being surrounded on the three sides by said first, second and third channels, respectively; a second extension at one end of each of said second channels extending beyond the corresponding end of both said first and third channels, a first and third extension at the other end of said first and third channels respectively extending beyond the corresponding end of said second channel; said first and second side channel molding interlocked to said main lug molding by having said second extension secured between said first and third extensions; said first, second and third conductor assemblies each being formed in a U-shape; said first and second side channel molding and said main lug molding forming a U-shaped support for said first, second and third conductor assemblies, and a mounting rib positioned between said first and second side channel moldings, and being perpendicular to said first, second and third planes.

7. The device of claim 6 in which said connector straps extend generally perpendicular to said side conductors of said conductor assemblies; said connector straps all terminating on a common surface of said side channel moldings to thereby permit protective equipment to be electrically connected to said conductor assemblies.

8. The device of claim 6 and a third and fourth side channel molding being identical in construction to each other and to said first and second side channel molding; said third and fourth side channel side channel molding interlocked to said first and second side channel molding by having said second extension secured between said first and third extensions.

9. The device of claim 8 in which said connector straps extend generally perpendicular to said side conductors of said conductor assemblies; said connector straps all terminating on a common surface of said side channel moldings to thereby permit protective equipment to be electrically connected to said conductor assemblies; said connector straps being in sequence arrangement whereby said connector straps from said first, second and third conductor assemblies form a repetitive pattern along said common surface of said side channel moldings.

10. A multi-phase panel interior of the type described comprised of a main lug molding, a first and second side channel molding, and a first, second and third conductor assembly; said first, second and third conductor assemblies each being comprised of a cross conductor with wire grip adapter connectors and two side conductors each with connector straps; said cross conductor and said side conductors of said first conductor assembly all lying in a single first plane; said cross conductor and said side conductors of said second conductor assembly all lying in a single second plane; said cross conductor and said side conductors of said third conductor assembly all lying in a single third plane; said first and second side channel molding being of identical construction; said first and second side channel molding and said main lug molding each being constructed with a first, second and third channel; said first channels of said first and second side channel molding and of said main lug molding lying in a single first plane; said second channels of said first and second side channel molding and of said main lug molding lying in a single second plane; said third channels of said first and second side channel molding and of said main lug molding lying in a single third plane; said first, second and third channel being in flat parallel relation with each other and adapted to receive said first, second and third conductor assemblies, respectively; a second extension at one end of each of said second channels extending beyond the corresponding end of both said first and third channels; a first and third extension at the other end of said first and third channels respectively extending beyond the corresponding end of said second channel; said first and second side channel molding interlocked to said main lug molding by having said second extension secured between said first and third extensions to thereby permit said first, second and third channels of said main lug molding and said first and second side channel molding to be in alignment and registry with each other so that said first, second and third extensions provide continuity of dielectric strength for said first, second and third conductor assemblies, respectively.

No references cited.